UNITED STATES PATENT OFFICE.

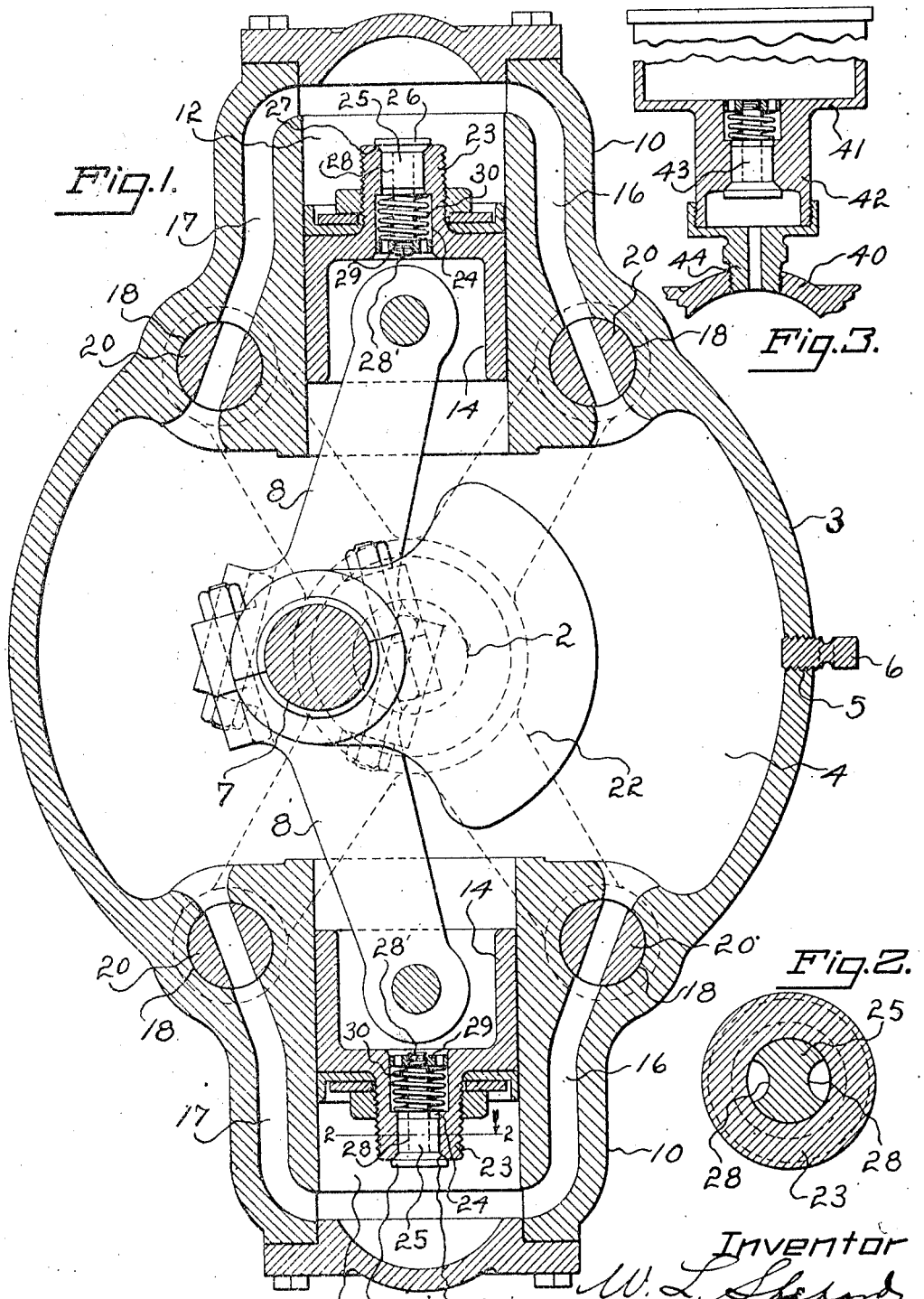

WILBUR L. SHEPARD, OF ELMWOOD, CONNECTICUT, ASSIGNOR OF ONE-THIRD TO HUBERT C. HART, OF UNIONVILLE, CONNECTICUT, AND ONE-THIRD TO WILLIAM H. LEGATE, OF HARTFORD, CONNECTICUT.

CLUTCH.

1,274,461.  Specification of Letters Patent.  Patented Aug. 6, 1918.

Application filed July 31, 1917. Serial No. 183,663.

*To all whom it may concern:*

Be it known that I, WILBUR L. SHEPARD, a citizen of the United States, residing at Elmwood, in the county of Hartford and State of Connecticut, have invented certain new and useful Improvements in Clutches, of which the following is a specification.

This invention relates to what I shall for convenience term a clutch and especially to that kind thereof wherein a suitable fluid under proper control is used to transfer the effect of a driving member to a driven member. An example of this type of clutch or analogous device is shown in Letters Patent No. 1,229,664 issued to me June 12, 1917, and to which reference may be had. As will be inferred the fluid for the transfer of energy from one element to the other of the clutch or for effecting a practically similar function, may within reasonable limits vary, although liquid such as suitable oil is what I prefer to utilize. In fact one of the primary objects I have in view is means for automatically replenishing the fluid or liquid used in the operation of the clutch or its equivalent. In clutches of this character using a fluid, it is found that there arises from natural causes a waste of the fluid and the fundamental purpose I have in view by the present invention is to provide means for automatically replenishing the liquid to thus insure at all times the proper action.

In the drawings accompanying and forming part of the present specification I have shown in detail two of the several convenient forms of embodiment of the invention, which to enable those skilled in the art to practice the same will be set forth fully in the following description. I do not of course, restrict myself to this particular disclosure, but may depart therefrom in several particulars. As a matter of fact the inveration comprehends broadly the replenishment of liquid or its equivalent utilized in the operation of the clutch in view of which circumstance the latter when acting to transfer energy from one element to another or performing a like office, can exercise at all times its maximum efficiency.

Referring to said drawings:

Figure 1 is a transverse section through a clutch involving the invention.

Fig. 2 is a sectional detail on the line 2—2 of Fig. 1, looking in the direction of the arrow.

Fig. 3 is a like view of a different form.

Like characters refer to like parts throughout the several views.

There is a shaft as 2 and this shaft may be either a driving or a driven shaft, depending upon which element of the clutch is the driving member and which the driven. Around this shaft 2 is a closed shell or casing. In the shell or casing 3 is a closed chamber as 4. This chamber is adapted to receive a suitable fluid generally in the form of some oil, the wall having an opening 5 closed by the screw plug 6. By taking out the screw plug the chamber 4 may be supplied in the first instance and at other times when required with oil. The shaft 2 extends through the chamber 4 and in practice will have associated with it stuffing boxes, glands or equivalent means to prevent leakage of oil from the chamber 4. In said chamber 4 the shaft 2 is equipped with a crank or eccentric 7 to which as shown are connected the duplicate connecting rods or pitmen 8. In the present case this crank 7 and its adjuncts present one element of the clutch, the other being the shell or casing 3 and its accessories.

Said shell or casing 3 as shown is furnished with the complemental outward and opposite extensions 10 which are internally cylindrically bored as at 12 respectively to receive the pistons 14 respectively. To the inner sides of the pistons 14 are jointed the outer terminals of the two connecting rods or pitmen 8 to which I have already referred. The extensions 10 are as shown provided each with channels or passages 16 and 17. The inner ends of these passages open into the chamber 4 and their outer ends into the respective piston chambers 12. The channels or passages 16 and 17 in turn are intersected by chambers as 18 respectively which receive valves as 20 connected to the arms of the spider 22 concentric with the shaft 2 and slidable thereon practically in the manner shown in my prior patent already identified. It will be clear that the valves 20 may be operated through the action of the spider 22 to entirely close the respective passages or channels 16 and 17, or to partially close or leave the same wide open as may be desired.

It will be assumed that the valves 20 are wholly closed, that the shaft 2 is being rotated, and that the crank or eccentric 7 constituting in this case a driving member is as a result turning. The consequence will, therefore, be that as the pistons 14 are blocked or prevented from movement in their respective chambers or cylinders 12, the rotation of the part 3 which in this case is the driven member of the clutch will be caused. Generally speaking this procedure is not unlike that shown in my prior patent. In said patent, however, is shown no means for automatically compensating for loss of oil by leakage or otherwise, and this as I have already explained is one of the fundamental purposes I have in view in the present case, whether the clutch be as already described as set forth in my prior patent or otherwise. I show two different ways of obtaining this automatic supply of oil as occasion requires therefor.

The heads of the respective pistons 14 have as shown bosses 23 and extending through said heads and through the respective bosses are passages 24 each of two diameters. The portions of lesser diameter of the respective passages receive the bodies of practically cylindrical check valves 25, the heads 26 of which are tapered to fit correspondingly tapered seats 27 at the outer ends of said passages 24 when the valves are closed. The cylindrical bodies of the two valves are shown furnished with lateral diametrically opposite channels 28 as shown best in Fig. 2. They also appear in Fig. 1. The heads of the valves when the latter are closed, prevent passage of oil from the chambers 12 to chamber 4. The enlarged portions of the passage 23 receive the stems 28′ of the respective valves, said stems as shown being furnished with nuts 29 constituting suitable stops. Said stems are surrounded by the coiled springs 30 bearing against the respective stops and valve bodies and which act normally to hold the valves closed as shown for instance by Fig. 1.

It will be assumed that the valves 20 are closed, that the shaft 2 is being driven and that as a consequence the two pistons 14 are being reciprocated in their chambers 12. In view of this circumstance the pistons cannot circulate oil back and forth between the two pairs of closed valves 20 and thus effect the rotation of the part 3 practically in the same manner shown in my prior Letters Patent. It will be assumed that oil from some cause has leaked from one of the pairs of passages 16 and 17 or chamber 12 into which they lead. The instant that this oil is lost by such leakage or otherwise, one, or both, of the check valves 26 is automatically opened by suction, thus letting into the passages 16 and 17 from the chamber 4 by way of the ports or perforations of the nuts 29 enough of the oil to take the place of that lost by leakage. After this occurs the springs 30 immediately close the valve or valves 25.

In Fig. 3 I show a modification. In this case the numeral 40 denotes a shell which except as to the provision of the oil replenishment means is exactly like that already described. This shell 40 is equipped with a pair of cups 41 (one only of which is shown) having stems 42 which are provided with valves 43 exactly like those already described. The stems 42 are reduced as at 44 and are threaded into the casing 40. In this case when the oil is wasted from leakage or otherwise valves, either one or both as 43 are automatically opened to at once supply the loss.

I should explain that the reduced portions 44 of the stems 42 are threaded into the plates or heads closing the opposite ends of the shell or casing. This shell or casing is precisely like the shell or casing 3 already described.

I have noted the fact that I have called the device herein as a matter of convenience a "clutch." The improvement when incorporated in an article of this character operates in a highly satisfactory manner. It is possible that the invention can be incorporated so far as the automatic supply of oil or similar substance is concerned, in other appurtenances.

What I claim is:

1. The combination of a rotary shell having a chamber, passages leading from said chamber at opposite sides thereof and also having cylinders in which the outer ends of the passages open, a valve extending across each of said passages, means for opening or closing the valve to either permit or check the flow of liquid from the chamber to and along said passages, pistons in the respective cylinders and at opposite sides of which the respective passages are situated, a shaft extending into the shell and operatively connected with the pistons, the shell having means associated therewith for receiving a liquid and also having automatically operable check valves adapted to be opened by suction to supply liquid to said passages on leakage of the liquid from the passages.

2. The combination of a rotary shell having a chamber, passages leading from said chamber at opposite sides thereof, and also having cylinders in which the outer ends of the passages open, a valve extending across each passage, means for opening or closing the valves to either permit or check the flow of liquid from the chamber to and along said passages, pistons in the respective cylinders and at opposite sides of which the respective passages are located, and outwardly opening check valves carried by the heads of the respective pistons.

In testimony whereof I affix my signature in the presence of two witnesses.

WILBUR L. SHEPARD.

Witnesses:
L. L. MARKEL,
HEATH SUTHERLAND.